(12) United States Patent
Davis et al.

(10) Patent No.: US 11,267,299 B1
(45) Date of Patent: Mar. 8, 2022

(54) HAND-HELD DEVICE FOR SEALING A TIRE TO A RIM DURING TIRE CHANGING

(71) Applicants: Steven Davis, Woodbury, TN (US); Layton Lee, Scottsdale, AZ (US); Josh Sortor, Scottsdale, AZ (US)

(72) Inventors: Steven Davis, Woodbury, TN (US); Layton Lee, Scottsdale, AZ (US); Josh Sortor, Scottsdale, AZ (US)

(73) Assignee: Hennessy Industries, Inc., LaVergne, TN (US)

( * ) Notice: Subject to any disclaimer, the term of this patent is extended or adjusted under 35 U.S.C. 154(b) by 536 days.

(21) Appl. No.: 15/922,527

(22) Filed: Mar. 15, 2018

Related U.S. Application Data (60) Provisional application No. 62/471,398, filed on Mar. 15, 2017.

(51) Int. Cl.
*B60C 25/14* (2006.01)
*B05B 1/00* (2006.01)
*B60C 25/12* (2006.01)
*B25G 1/10* (2006.01)

(52) U.S. Cl.
CPC ............ *B60C 25/145* (2013.01); *B05B 1/005* (2013.01); *B60C 25/12* (2013.01); *B25G 1/102* (2013.01)

(58) Field of Classification Search
CPC ....... B60C 25/145; B60C 25/12; B25G 1/102; B05B 1/005
USPC ............................................................. 157/1
See application file for complete search history.

(56) References Cited

U.S. PATENT DOCUMENTS

| | | | | |
|---|---|---|---|---|
| 5,803,108 A | * | 9/1998 | Schuessler, Jr. ...... | B60C 29/062 137/15.08 |
| 8,707,829 B2 | * | 4/2014 | Kerner ................... | B29C 73/08 81/15.7 |
| 2005/0115633 A1 | * | 6/2005 | Kroll ...................... | B60S 5/046 141/65 |
| 2012/0011968 A1 | * | 1/2012 | Handerhan ............. | E05B 19/20 81/15.9 |
| 2017/0088102 A1 | * | 3/2017 | Davidson .............. | B60C 25/145 |

* cited by examiner

Primary Examiner — David B. Thomas
Assistant Examiner — Thomas Raymond Rodgers
(74) Attorney, Agent, or Firm — Patterson Intellectual Property Law, P.C.; Ryan D. Levy; Mark A. Kilgore (57) ABSTRACT

A hand-held sealing device may be used for sealing a tubeless tire on a corresponding wheel rim. The wheel rim may have a valve stem hole to receive a valve stem. The hand-held sealing device may include a device body. The device body may include an air output nozzle, a directed air outlet defined in the air output nozzle, and an air inlet defined in the device body. The air inlet may be fluidly communicated with the directed air outlet. The hand-held sealing device may also include a valve assembly disposed between the directed air outlet and the air inlet. A cable may be slidably disposed in the air output nozzle. The cable may pass through the directed air outlet. A valve stem engagement member may be configured to removably attach to the valve stem. The valve stem engagement member may be connected to the cable.

17 Claims, 10 Drawing Sheets

HAND-HELD DEVICE FOR SEALING A TIRE TO A RIM DURING TIRE CHANGING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to methods and devices for sealing a tubeless tire to a wheel rim during the tire changing process. Previous techniques for sealing a tire to a wheel rim involve air jets mounted to a turntable of a tire changing machine or hand-held bead blasting nozzles. Both techniques utilize directing pressurized air at a gap between the tire and wheel rim to rapidly expand the tire. The tire expands and meets the wheel rim, thereby forming enough of a seal that conventional inflation techniques may be used to further pressurize the air chamber between the tire and wheel rim.

Air jets mounted to a turntable of a tire changing machine may have air flow restrictions based on design parameters of the tire changing machine. Hand-held bead blasting nozzles may provide more air flow, but can be difficult to use when an operator wishes to properly aim the nozzle. Much of the pressurized air can be wasted due to the angle at which the pressurized air is introduced. The pressurized air flow must hit the wheel rim, then the wall of the tire opposite the nozzle, and continue to circulate about the interior cavity between the tire and wheel rim. Further, none of the known designs address properly securing the valve stem of the wheel assembly in place.

What is needed, then, is a method and apparatus that allows for introduction of pressurized air into the interior cavity between the tire and wheel rim through a valve stem hole in the wheel rim.

BRIEF SUMMARY OF THE INVENTION

The present invention is related to a device and method of sealing a tubeless tire to a corresponding wheel rim. The device may include a hand-held air valve with a nozzle to direct pressurized air through a valve stem hole in the wheel rim. The device may further include a valve stem engagement member that is configured to removably attach to the valve stem of the wheel assembly. The valve stem engagement member may be connected to a cable. The cable may be pulled by a user to bring the valve stem through the valve stem hole in the wheel rim.

DETAILED DESCRIPTION OF THE INVENTION

Reference will now be made in detail to embodiments of the present invention, one or more drawings of which are set forth herein. Each drawing is provided by way of explanation of the present invention and is not a limitation. In fact, it will be apparent to those skilled in the art that various modifications and variations can be made to the teachings of the present invention without departing from the scope of the invention. For instance, features illustrated or described as part of one embodiment can be used with another embodiment to yield a still further embodiment.

Thus, it is intended that the present invention covers such modifications and variations as come within the scope of the appended claims and their equivalents. Other objects, features, and aspects of the present invention are disclosed in, or are obvious from, the following detailed description. It is to be understood by one of ordinary skill in the art that the present discussion is a description of exemplary embodiments only and is not intended as limiting the broader aspects of the present invention.

Unless specifically stated otherwise, any part of the apparatus of the present invention may be made of any appropriate or suitable material including, but not limited to, metal, alloy, polymer, polymer mixture, wood, composite, or any combination thereof. Additionally, any part of the apparatus of the present invention may be flexible, semi-flexible, rigid, or may include portions that are relatively flexible and portions that are relatively flexible.

Figure 1:
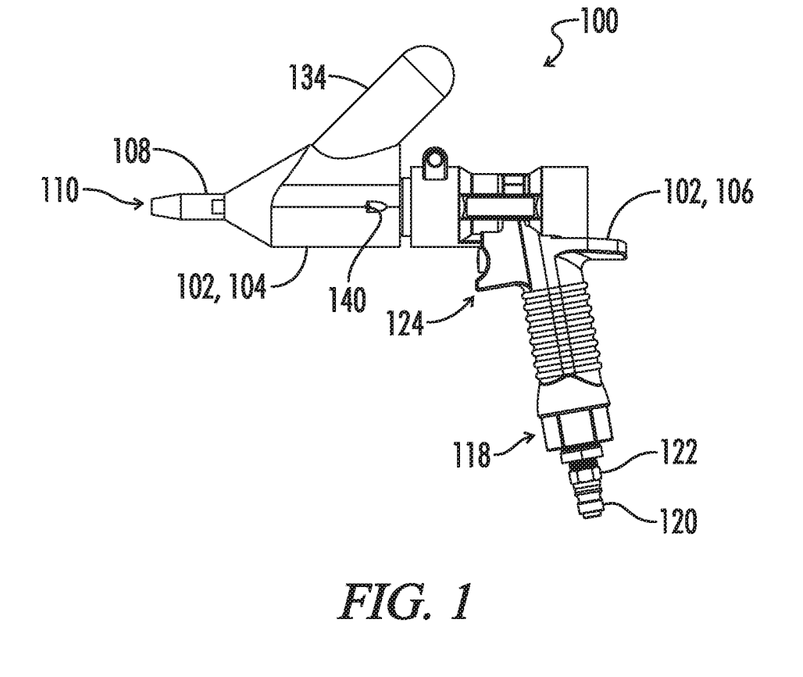
FIG. 1 is a perspective view of an embodiment of the hand-held sealing device.
Figure 2:
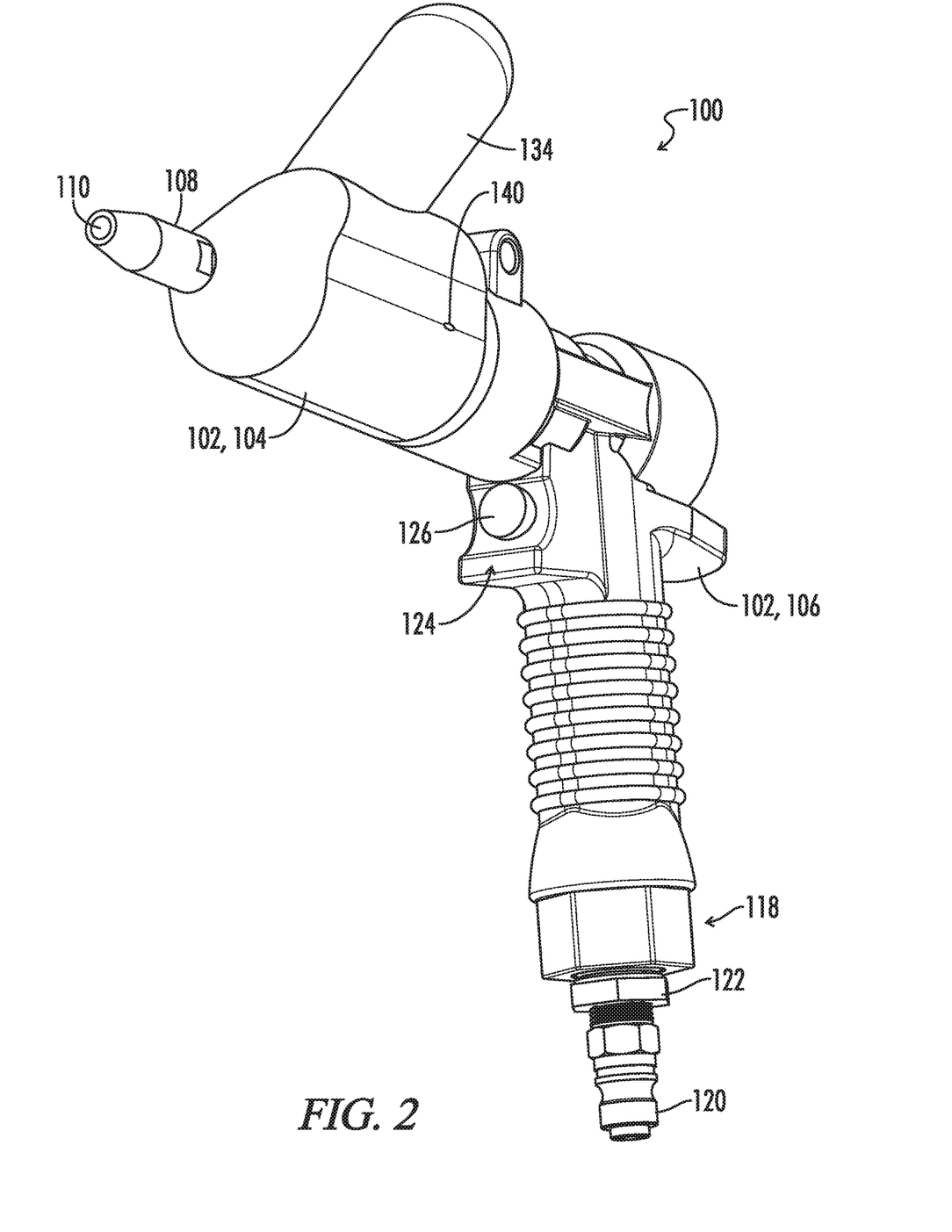
FIG. 2 is a bottom front perspective view of the hand-held sealing device of FIG. 1.
Figure 3:
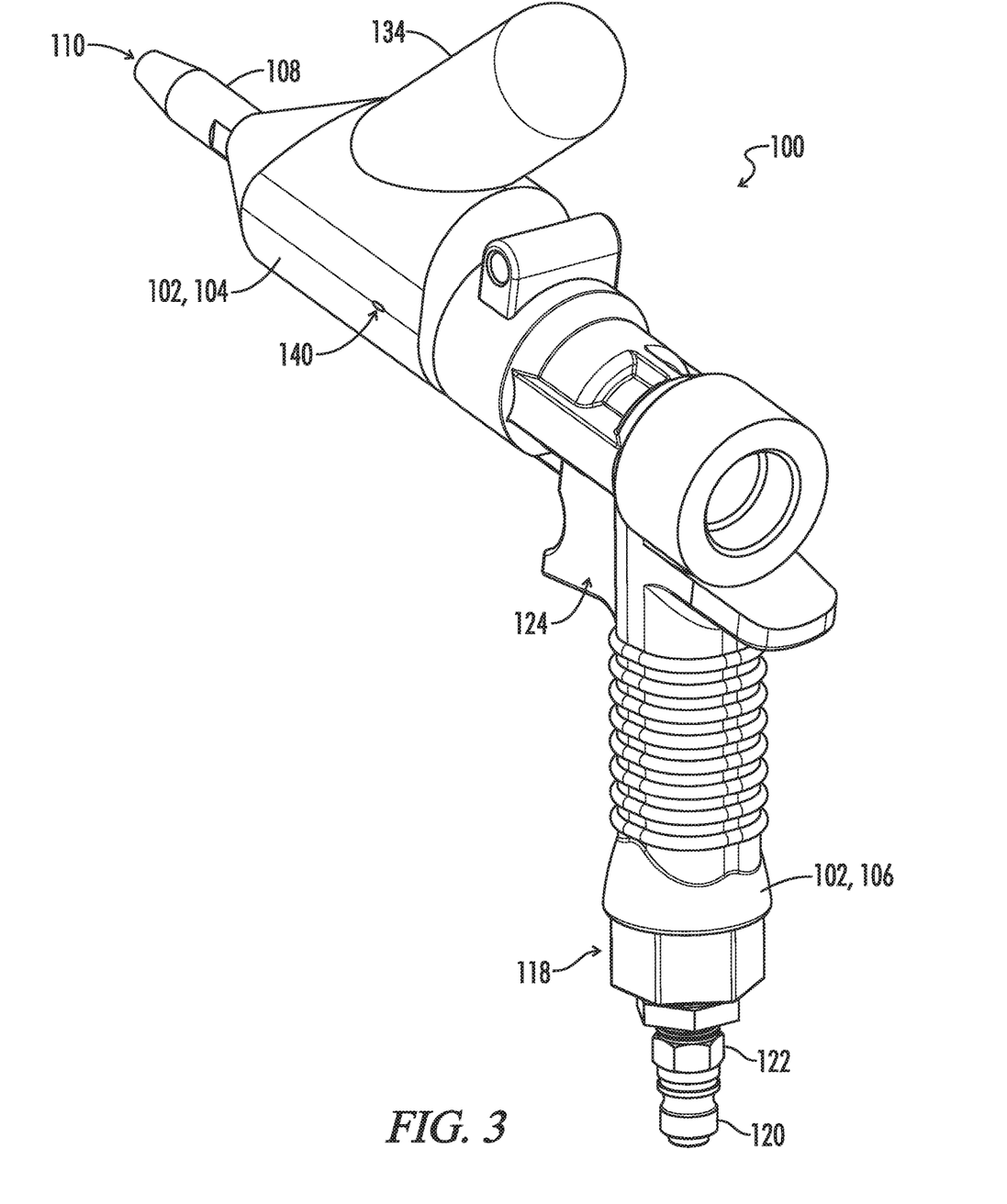
FIG. 3 is a top rear perspective view of the hand-held sealing device of FIG. 1.
Figure 4:
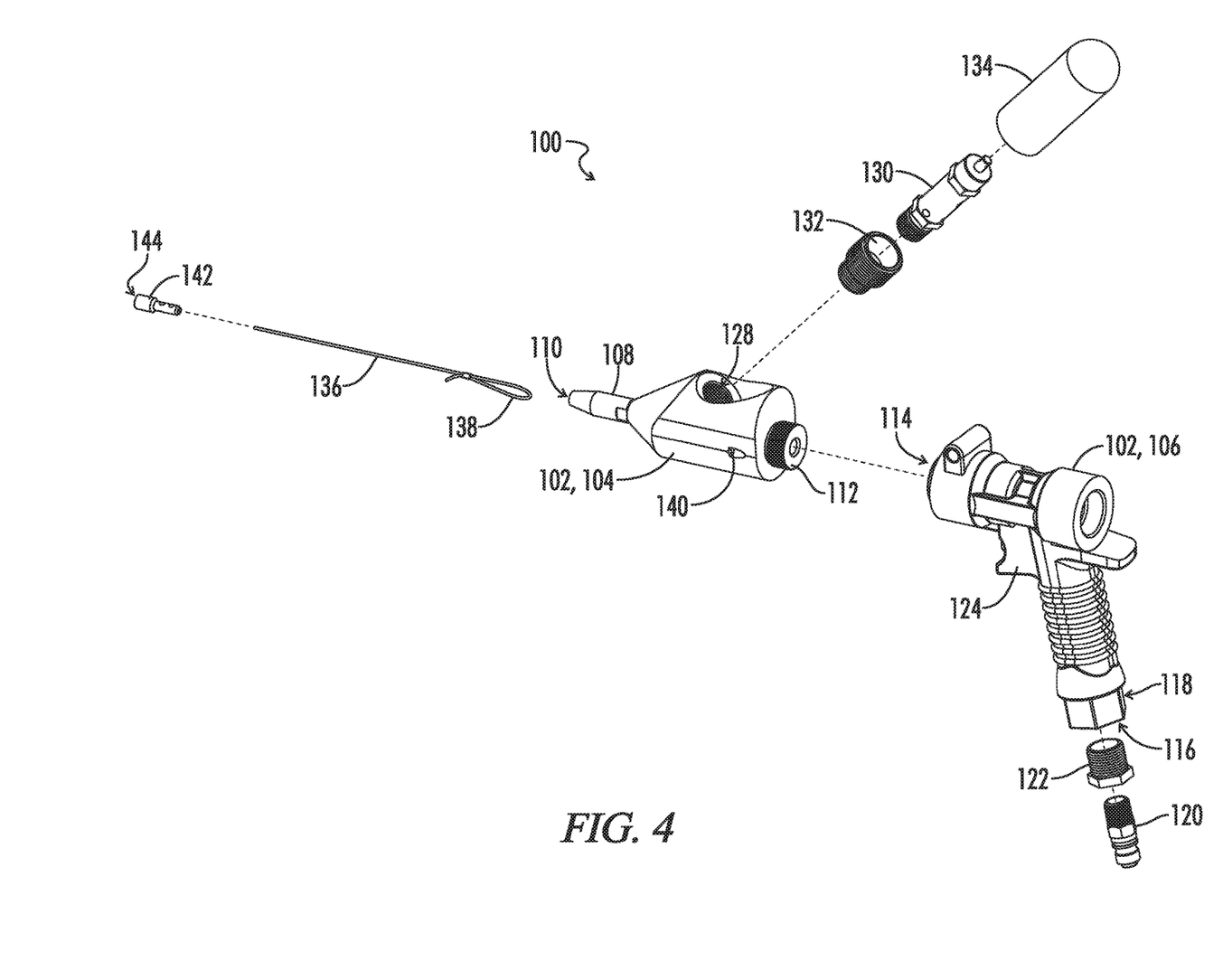
FIG. 4 is a perspective exploded view of another embodiment of the hand-held sealing device of the current invention.
Figure 5:
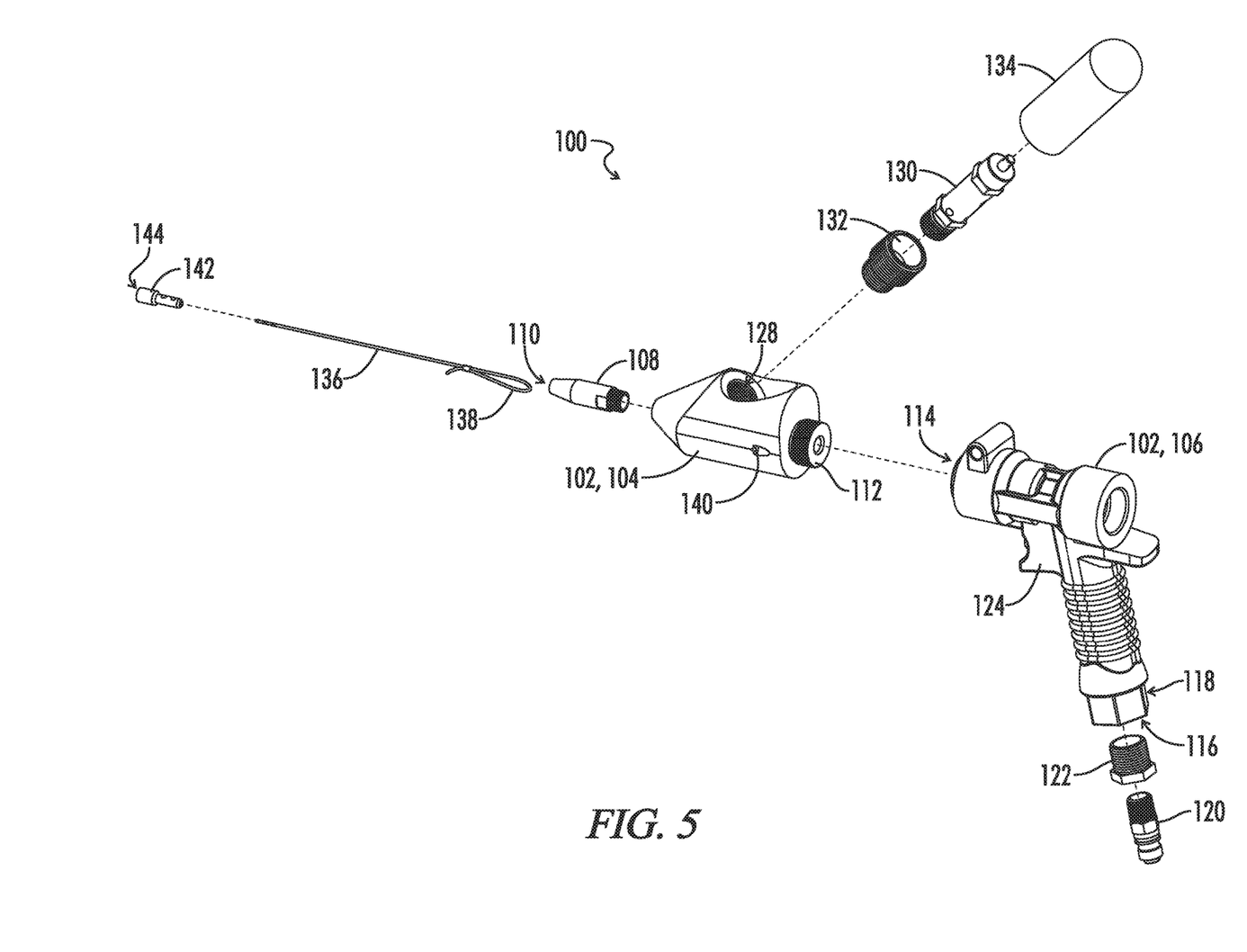
FIG. 5 is a perspective exploded view of another embodiment of the hand-held sealing device of the current invention.

Turning now to FIG. 1, an embodiment of a hand-held sealing device 100 of the present invention is shown. The hand-held sealing device 100 is shown including a device body 102. The device body 102 may be a single unitary part or may be multiple connected parts. The embodiments shown in the FIGS. 4 and 5 illustrate a device body 102 made up of multiple connected parts. For example, an air output nozzle 104 is removably connected to a handle portion 106.

Figure 6:
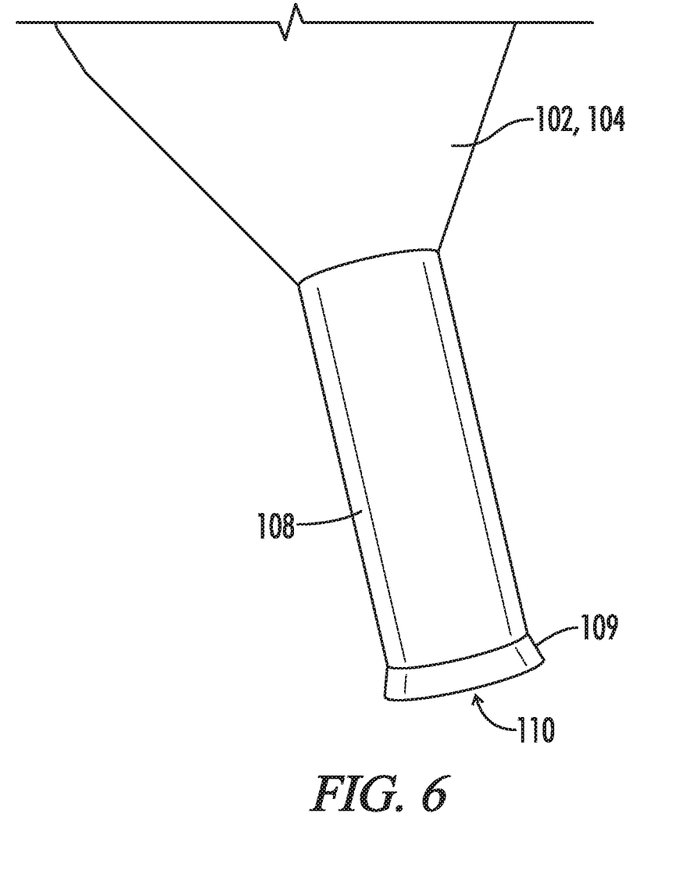
FIG. 6 is a detailed perspective view of an embodiment of an air output nozzle for use as part of a hand-held sealing device of the current invention.
Figure 7:
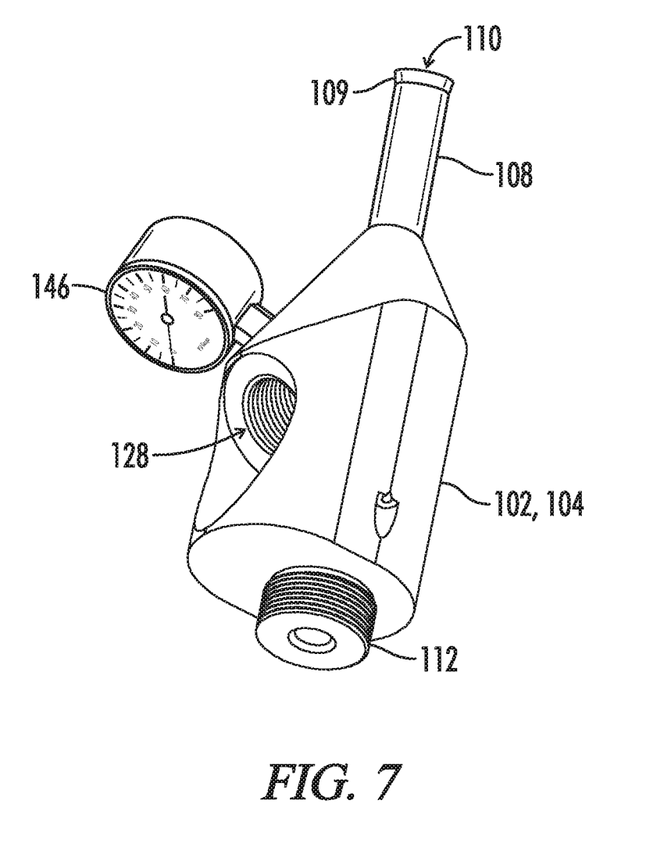
FIG. 7 is a perspective view of another embodiment of an air output nozzle for use as part of a hand-held sealing device of the current invention.

The air output nozzle 104 may include a nozzle tip portion 108. The nozzle tip portion 108 may be integrally formed with the rest of the air output nozzle 104. Alternatively, the nozzle tip portion 108 may be removably connected to the rest of the air output nozzle 104 (as shown in FIG. 5). In such an embodiment, the nozzle tip portion 108 may be reusable or may be disposable. The nozzle tip portion 108 may also be replaced when it becomes worn out from repeated use. The nozzle tip portion 108 may be configured to interface with the surface of the wheel rim 29 at the valve stem hole 39 to allow air flow directly through the valve stem hole. In embodiments having a removable nozzle tip portion 108, a variety of different nozzle tip portions may be used, each nozzle tip portion corresponding to a particular geometry and diameter of a respective valve stem hole 39. In some embodiments, the diameter of the nozzle tip portion 108 may be at least 0.625 inches. In other embodiments, the diameter may be at least 0.453 inches. In yet other optional embodiments, the diameter of the nozzle may be of any suitable size to allow at least a partial seal of the nozzle surrounding the valve stem hole. The nozzle tip portion 108 may interface with the surface of the wheel rim 29 by being simply pressed against the rim, or may additionally include a fastener to attach the nozzle tip portion to the wheel rim. As shown in FIGS. 6 and 7, some embodiments may further include a seal member 109 disposed on the nozzle tip portion 108. The seal member 109 may be an integral portion of the nozzle tip portion 108 or may be a separate seal connected thereto. In at least one embodiment, the seal member 109 may be a flared out portion of the nozzle tip portion 108 which extends outward from the outer surface of the air output nozzle 104. The seal member 109 may allow for a larger surface area of contact between the nozzle tip portion 108 and the wheel rim 29. It is to be understood that embodiments with the nozzle tip portion 108 or the seal member 109 may engage the wheel rim 29 to form at least a partial seal between the device 100 and the rim 29. This at least partial seal may prevent at least some of the pressurized air from escaping from the space between the rim 29 and the device 100.

The nozzle tip portion 108 made be made of any suitable material and may be flexible, semi-flexible, rigid, or may include portions that are relatively flexible and portions that are relatively rigid. In some embodiments, the nozzle tip portion 108 and/or the seal member 109 may be made of non-marring material so as to decrease the chance of marring the rim surface 29 or the nozzle tip and/or seal member when contact is made between the device 100 and the rim. Suitable non-marring material may include, but is not limited to urethane, polyurethane, rubber, copper, plastic, brass, aluminum, and the like.

Turning to FIGS. 2-5, the air output nozzle 104 may also include a directed air outlet 110 defined therein. Some embodiments may particularly include the directed air outlet 110 defined in the nozzle tip portion 108.

In embodiments having the air output nozzle 104 removably connected to the handle portion 106, as shown in FIGS. 4 and 5, the air output nozzle may include a male fastener member 112. Correspondingly, the handle portion 106 may include a female fastener member 114 configured to removably receive the male fastener member 112. Of course, other removable connection configurations are contemplated, including the handle portion 106 having the male fastener member 112 and the air output nozzle 104 having the female fastener member 114. These fastener members 112, 114 may removably connect by any appropriate configurations, including threaded interfaces, detent mechanisms, various fits created by dimensions of the respective components, use of additional fasteners, and the like.

The hand-held sealing device 100 may further include an air inlet 116 (FIG. 4) defined in the device body 102. The air inlet 116 may be fluidly communicated with the directed air outlet 110. In many embodiments, the air inlet 116 may be defined in the handle portion 106 of the device body 102. Some embodiments may include the air inlet 116 defined in a distal end 118 of the handle portion 106. Many embodiments of the hand-held sealing device 100 include a handle portion 106 shaped like the handle of a pistol. In such embodiments, the air inlet 116 may be defined in a location of the handle portion 106 corresponding to the location of a hammer of a typical pistol. Other embodiments may include the air inlet 116 defined in a location of the handle portion 106 corresponding to the location of the butt of the handle of a typical pistol.

Figure 8:
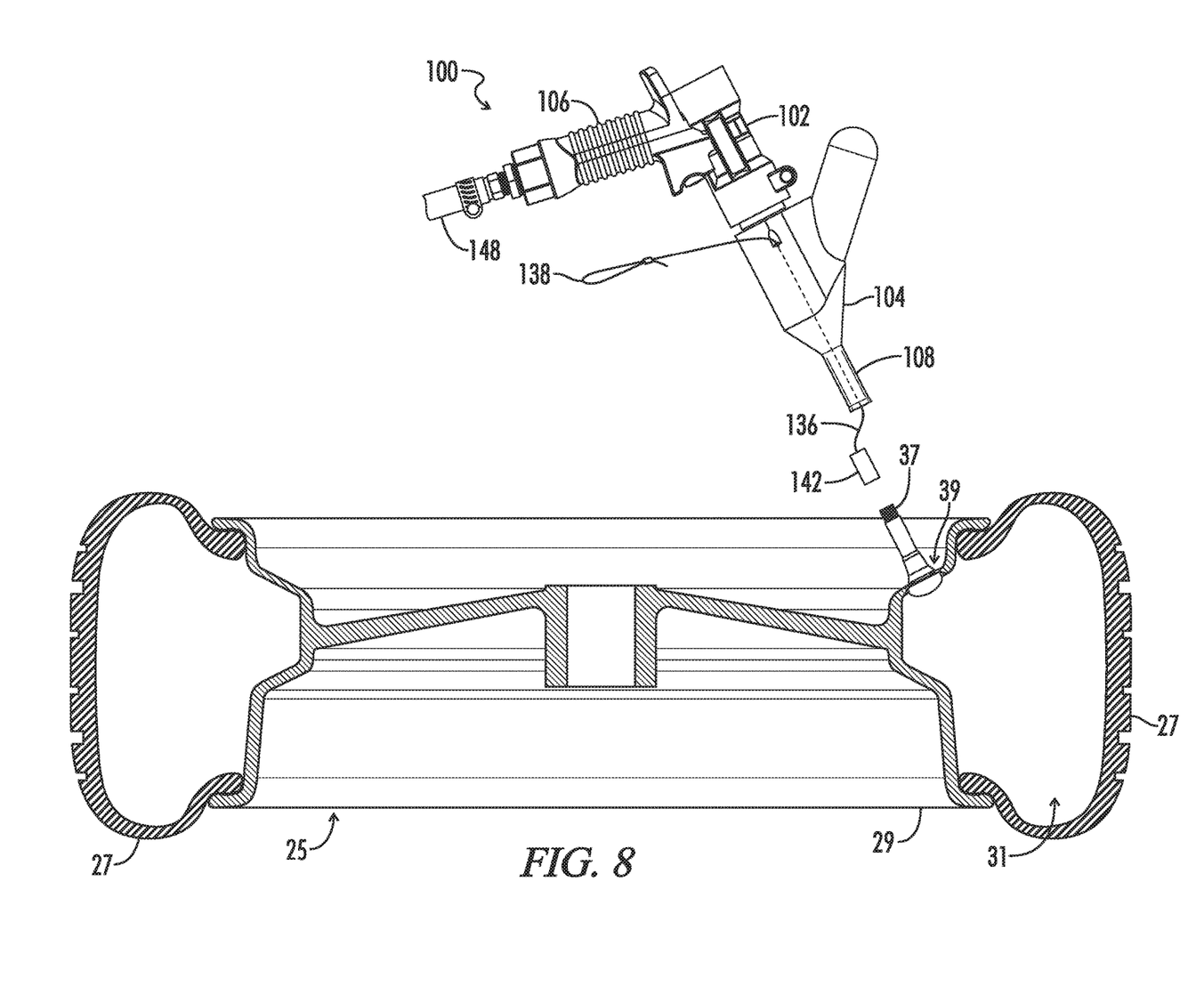
FIG. 8 is a detailed perspective view of the hand-held sealing device and a wheel and tire assembly.
Figure 9:
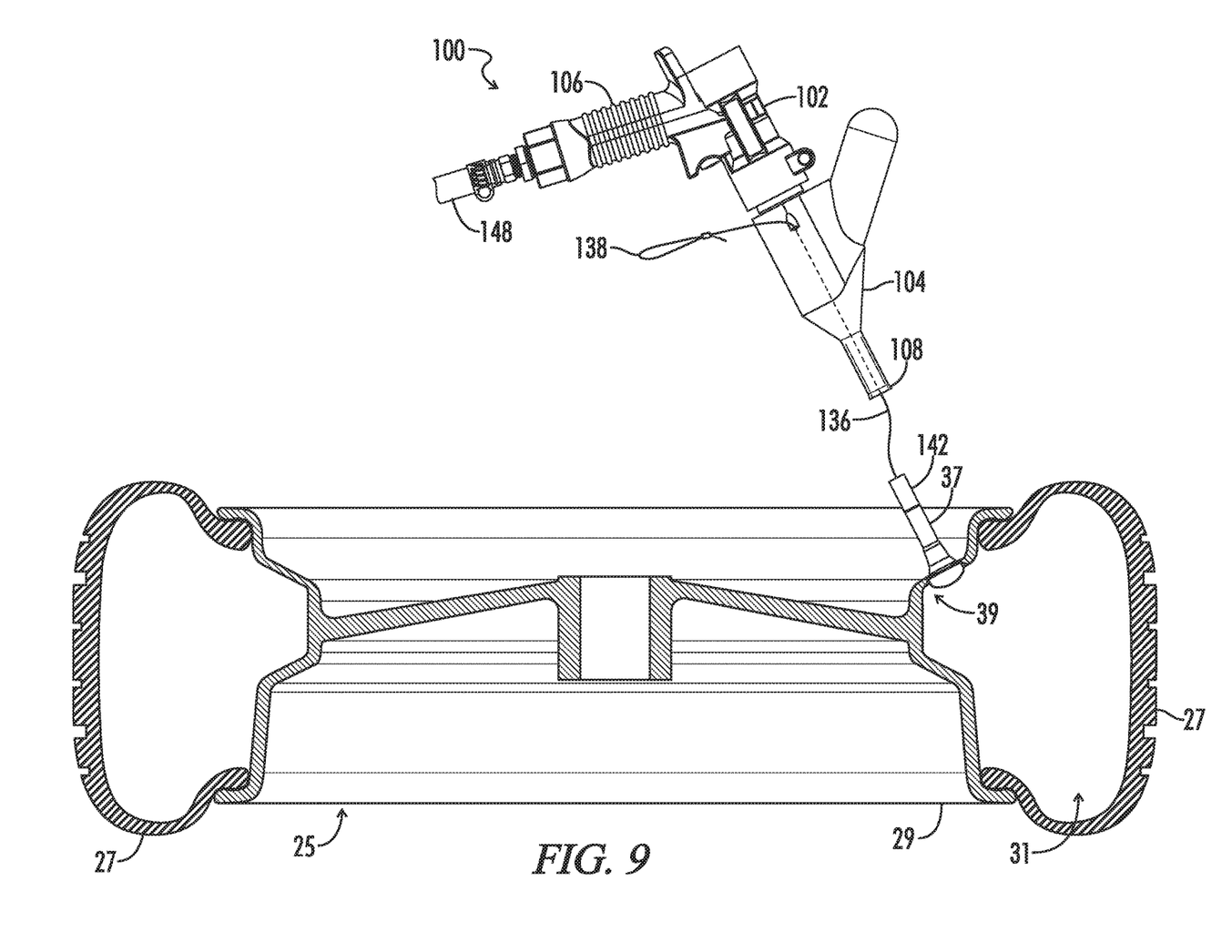
FIG. 9 is a detailed perspective view of the hand-held sealing device connected to the valve stem of a wheel and tire assembly.
Figure 10:
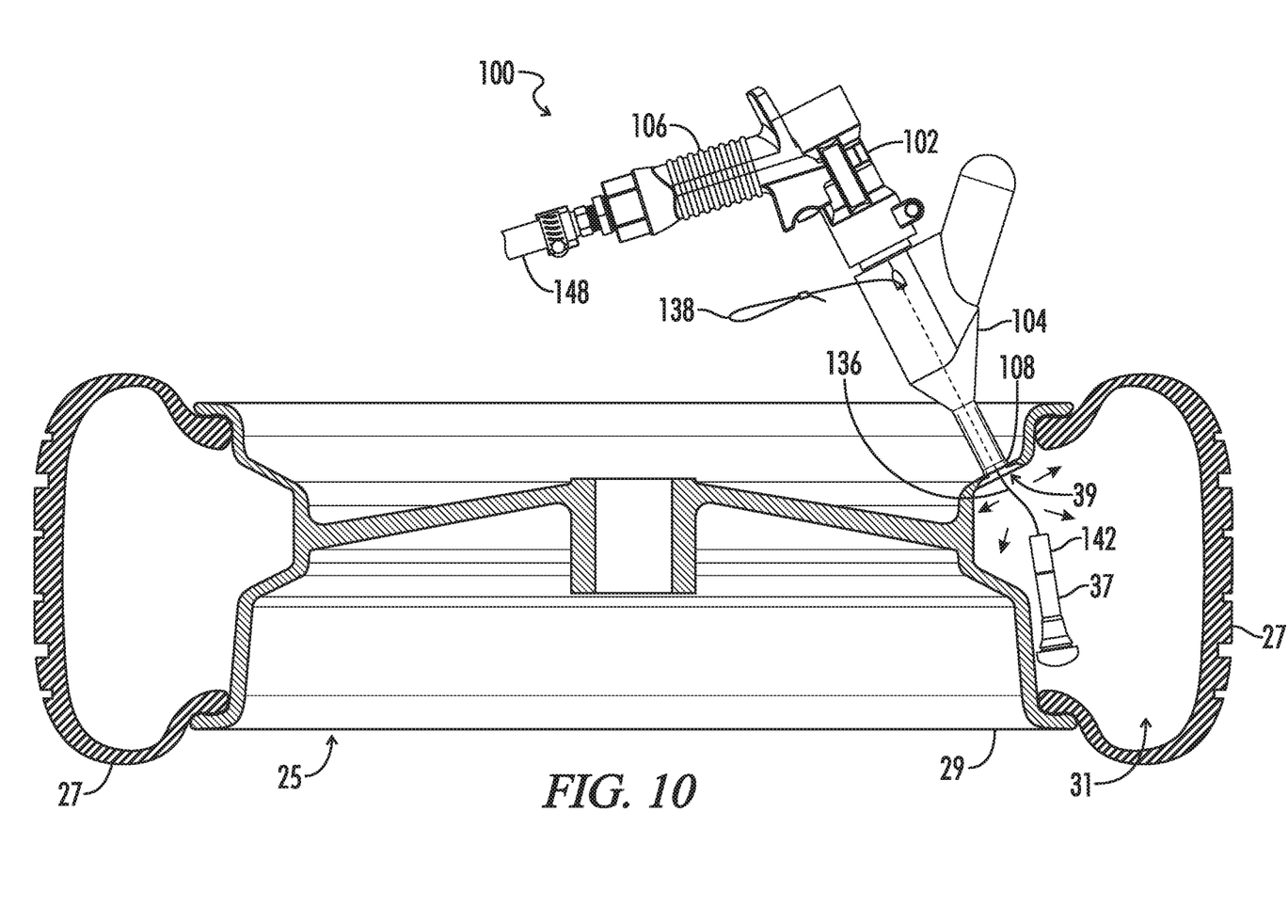
FIG. 10 is a detailed perspective view of the hand-held sealing device contacting the wheel and tire assembly about the valve stem hole with air pressure being released into the wheel and tire cavity.

Other embodiments may include a fitting 120 removably or permanently connected to the handle portion 106. This fitting 120 may be configured to receive a pressurized air line 148 (FIGS. 8-10). In some embodiments, the fitting 120 is removably connected to a bushing 122 that is, in turn, removably connected to the handle portion 106 in the air inlet 116. In many embodiments, the fitting 120 may be a quick-connect fitting to receive a quick-connect end of a pressurized air line 148.

A valve assembly 124 may be disposed along the fluid communication pathway between the air inlet 116 and the directed air outlet 110. The valve assembly 124 may, in some embodiments, include an activation trigger 126 (FIG. 2) that may be configured to open the fluid communication pathway between the air inlet 116 and the directed air outlet 110 when engaged by a user. In some embodiments, the trigger 126 is depressed opening the valve and allowing fluid communication between the air inlet 116 and the directed air outlet 110. Upon release of the trigger 126, the valve is closed which prohibits the fluid communication and air flow between the inlet 116 and outlet 110. Any other appropriate valve assembly is also contemplated, however, including user-controlled valve assemblies and controller-controlled valve assemblies.

In other embodiments, the trigger 126 may be hand-operated by a user. In other embodiments, actuation of the valve assembly 124 may be foot-operated wherein a pedal may be used to actuate the valve assembly. In yet another embodiment, the valve assembly 124 may be actuated when the user contacts the apparatus against the rim 29. Upon contact, the user may push the sealing device 100 so as to depress the actuator of the valve assembly 124 thus opening the communication pathway between the air inlet 116 and direct air outlet 110. In some embodiments, the valve assembly 124 may be controlled by mechanical, electrical, or pneumatic actuation.

As shown in FIGS. 4 and 5, the hand-held sealing device 100 may further include, in some embodiments, a relief air outlet 128 defined in the device body 102. In some embodiments, the relief air outlet 128 may be defined in the air output nozzle 104 and may be fluidly connected to at least one of the air inlet 116 and the directed air outlet 110. In other embodiments, the relief air outlet 128 may be fluidly connected to a point along the fluid communication pathway between the air inlet 116 and the directed air outlet 110. A relief valve 130 may be removably or permanently connected to the device body 102 and fluidly connected with the relief air outlet 128. In some embodiments, the relief valve 130 may be removably connected to an adapter 132 that may be, in turn, removably connected to the device body 102 in the relief air outlet 128. Many embodiments may further include a muffler 134 disposed on or about the relief valve 130 to reduce noise produced by air escaping the relief valve.

In some embodiments, the relief valve 130 may act to regulate the air pressure inside the cavity 31 between the tire 27 and rim 29 from surpassing a predetermined threshold pressure. Upon the predetermined threshold being reached, the relief valve 130 may be actuated to release the pressurized air to the atmosphere. In some embodiments, the threshold level may be 20 psi or greater. In some embodiments, the threshold level may be 25 psi or greater. In some embodiments, the threshold level may be 30 psi or greater. In some embodiments, the threshold level may be 35 psi or greater. In some embodiments, the threshold level may be 40 psi or greater. The relief valve 130 may be controlled by mechanical, electrical, or pneumatic actuation.

Embodiments of the hand-held sealing device 100 may also include a cable 136 (FIGS. 4 and 5) slidably disposed in the device body 102. The cable 136 may pass through the directed air outlet 110 in some embodiments. Some embodiments may include the cable 136 slidably disposed in the air output nozzle 104. The cable 136 may include a user engagement member 138. In some embodiments, the user engagement member 138 may be a handle, arm, knob, grip, loop or the like. The user engagement member 138 may be disposed outside of the air output nozzle 104 such that a user may pull the cable by the user engagement member while using the hand-held sealing device 100. The user engagement member 138 is shown proximate to the muffler 134 in the embodiment of the hand-held sealing device 100 of FIG. 1. Returning to FIGS. 2-5, the device body 102 may include a cable opening 140 defined therein. The cable opening 140 may be configured to allow the cable 136 to pass therethrough. The cable 136 may pass through the cable opening 140 and proceed to pass through the directed air outlet 110. The current invention is not limited to a cable 136, however. The hand-held sealing device 100 may instead include any elongate member that has enough flexibility to perform the disclosed task below. "Cable", therefore, should be interpreted to mean any elongate flexible member including straps, chains, ropes, threads, cordage, strips, and the like.

The hand-held sealing device 100 may further include a valve stem engagement member 142. The valve stem engagement member 142 may be configured to removably connect to a valve stem 37 of a respective wheel assembly 25. In some embodiments, the valve stem engagement member 142 may include a female threaded end 144 that may be configured to receive the male end threads of a given valve stem 37. The female threads may engage the male threads of the valve stem 37 such that the valve stem engagement member 142 may retain the valve stem when the valve stem is located in the cavity 31 of the wheel assembly 25.

In another embodiment, the internal threaded portion of the female threaded end 144 may have a minor diameter of 0.285 inches to 0.277 inches with 32 threads per inch. Generally, a valve stem 37 may include male threads which have a 0.302 inch major diameter and 32 threads per inch. In yet other optional embodiments, the threaded portion of the valve stem engagement member 142 may be of any suitable diameter and thread count to engage a corresponding threaded portion on a valve stem 37.

In yet another embodiment, the valve stem engagement member 142 may connect to the valve stem 37 in a way other than being threaded. In one embodiment, the valve stem engagement member 142 may include a clamping mechanism which engages the valve stem 37 with sufficient pressure to maintain contact through the use of the device 100. In other embodiments, the device 100 may include a quick connect which allows for easy and quick connecting and removal of the valve stem 37 during use.

The valve stem engagement member 142 may further be removably or permanently connected to the cable 136. In some embodiments, the valve stem engagement member 142 may be crimped onto the cable 136 with pliers or any other appropriate tool. Some embodiments may contemplate replaceable or disposable valve stem engagement members 142. The valve stem 37 may be of any appropriate manufacture known in the art and suitable for inflation of the corresponding tire 27. Some valve stems 37 may include exterior valve stem threads on at least a portion of the outer surface of the valve stem.

Turning now to FIG. 7, the hand-held sealing device 100 may further include a pressure gauge 146 fluidly connected with the fluid communication pathway between the air inlet 116 and the directed air outlet 110. This inflation gauge 146 may be configured to monitor and/or display the pressure of the air in the fluid communication pathway during delivery of pressurized air flow to the cavity 31 of the wheel assembly 25. The inflation gauge 146 may be removably or permanently connected to the device body 102 in some embodiments.

Some embodiments of the hand-held sealing device 100 may also include a clocking mark on at least one of the cable 136 and the valve stem engagement member 142. The clocking mark may be configured to indicate to a user the orientation of the valve stem 37 (including an attached TPMS sensor, if present) during use of the hand-held sealing device 100.

The present invention further relates to a method of assembling a wheel assembly 25 having a tubeless tire 27, a corresponding wheel rim 29, and a corresponding valve stem 37. The method may include providing the wheel rim 29 with the tubeless tire 27 disposed thereon in an unsealed configuration (as shown in FIGS. 8-10); attaching a valve stem engagement member 142 to the valve stem 37 of the wheel assembly 25; pressing an air output nozzle 104 against the wheel rim such that a directed air outlet 110 defined in the air output nozzle is placed over a valve stem hole 39 defined in the wheel rim; releasing a pressurized air flow through the directed air outlet, through the valve stem hole, and into a cavity 31 defined between the tubeless tire and the corresponding wheel rim; sealing the tubeless tire on the corresponding wheel rim; and pulling a cable 136 connected to the valve stem engagement member 142, thereby positioning the valve stem in the valve stem hole.

The method may further include passing the elongate flexible member through the valve stem hole and attaching the valve stem 37 to the valve stem engagement member while the valve stem is on the side of the wheel rim corresponding to the cavity 31. The method may also include allowing the valve stem 37 to drop into the tire while the air output nozzle 104 is pressed against the wheel rim 29. The method may further still include releasing the pressurized air flow through the directed air outlet by engaging a valve assembly 124. Still another embodiment of the method may include removing the valve stem engagement member 142 from the valve stem 37 once the tubeless tire 27 is sealed on the corresponding wheel rim 29; and further inflating the tubeless tire to the appropriate usage pressure with an air compressor.

It should be understood that the hand-held sealing device 100 may be a stand-alone system that may have its own dedicated air supply line and machinery which allows for the device to be used. Alternatively, the hand-held sealing device 100 may be incorporated into existing tire changing and air filling stations so as to allow the user to not have to remove the tire and go to different stations to complete the process of changing a tire, filling a tire with air, or the like. Other stations may include, but are not limited to a tire changer device, tire balancer device, inflation device, or the like.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

Although embodiments of the invention have been described using specific terms, such description is for illustrative purposes only. The words used are words of description rather than limitation. It is to be understood that changes and variations may be made by those of ordinary skill in the art without departing from the spirit or the scope of the present invention, which is set forth in the following claims. In addition, it should be understood that aspects of the various embodiments may be interchanged in whole or in part. While specific uses for the subject matter of the invention have been exemplified, other uses are contemplated. Therefore, the spirit and scope of the appended claims should not be limited to the description of the versions contained herein.

Thus, although there have been described particular embodiments of the present invention of a new and useful HAND-HELD DEVICE FOR SEALING A TIRE TO A RIM DURING TIRE CHANGING it is not intended that such references be construed as limitations upon the scope of this invention except as set forth in the following claims.

What is claimed is:

1. A hand-held sealing device for sealing a tubeless tire on a corresponding wheel rim having a valve stem hole defined therein, the hand-held sealing device comprising:
    a device body, with:
        an air output nozzle, the air output nozzle having a distal end and proximal end relative to the device body;
        a directed air outlet defined in the distal end of the air output nozzle; and
        an air inlet defined in the device body, the air inlet fluidly communicated with the directed air outlet;
    a valve assembly disposed between the directed air outlet and the air inlet;
    an elongate flexible member slidably disposed in the air output nozzle, the elongate flexible member having a first end and second end, the first end having a user-engagement member projecting from the air output nozzle via a cable opening, the cable opening extending from the directed air outlet to an outer surface of the device body wherein the first end of the elongate flexible member is disposed external to the device body for engagement by the user, the second end of the elongate flexible member having a valve stem engagement member configured to removably attach to the valve stem, the second end passing through the directed air outlet.

2. The hand-held sealing device of claim 1, wherein the air output nozzle comprises a tip portion integrally formed with the air output nozzle.

3. The hand-held sealing device of claim 2, wherein the tip portion is configured to contact a surface of the wheel rim bordering the valve stem hole wherein at least a partial seal is created bordering the valve stem hole.

4. The hand-held sealing device of claim 3, wherein the tip portion comprises an outer surface, the seal member extending outwardly from the outer surface of the tip portion.

5. The hand-held sealing device of claim 1, wherein the air output nozzle comprises a tip portion removably connected to the air output nozzle.

6. The hand-held sealing device of claim 5, wherein the tip portion is configured to contact a surface of the wheel rim bordering the valve stem hole wherein at least a partial seal is created bordering the valve stem hole.

7. The hand-held sealing device of claim 6, wherein the tip portion comprises an outer surface, the seal member extending outwardly from the outer surface of the tip portion.

8. The hand-held sealing device of claim 1, wherein the device body further comprises a handle, the handle having a distal end wherein the air inlet is defined in the distal end of the handle.

9. The hand-held sealing device of claim 1, further comprising a relief air outlet defined in the device body.

10. The hand-held sealing device of claim 9, wherein the relief air outlet is defined in the air output nozzle.

11. The hand-held sealing device of claim 9, further comprising a relief valve, the relief valve having a proximal end and a distal end, the proximal end of the relief valve connected to the device body at the relief air outlet.

12. The hand-held sealing device of claim 11, further comprising a muffler disposed about the distal end of the relief valve.

13. The hand-held sealing device of claim 1, further comprising an air pressure gauge fluidly connected between the air inlet and the directed air outlet.

14. A hand-held sealing device for sealing a tubeless tire on a corresponding wheel rim having a valve stem hole defined therein, the hand-held sealing device comprising:
    a hand-held device body, the body having a handle, an outlet end, an inlet end, and a fluid communication pathway disposed between the outlet end and the inlet end, the handle being disposed about the inlet end;
    an air output nozzle having an outer surface, and a distal end and proximal end relative to the device body, the proximal end of the air output nozzle connected to the outlet end of the hand-held device body, the distal end of the air output nozzle having a directed air outlet and configured to contact a surface of the wheel rim bordering the valve stem hole wherein at least a partial seal is created bordering the valve stem hole;
    a relief air outlet defined in the air output nozzle, a relief valve having a proximal and distal end, the proximal end of the relief valve being connected to the relief air outlet, the distal end being connected to a muffler;

an air inlet defined in the handle of the device body, the air inlet fluidly communicated with the directed air outlet, the air inlet configured to receive a pressurized air line;

an elongate flexible member slidably disposed in the air output nozzle, the elongate flexible member having a first end and second end, the first end having a user-engagement member projecting from the air output nozzle via a cable opening, the cable opening extending from the directed air outlet to the outer surface wherein the first end of the elongate flexible member is disposed external to the device body for engagement by the user, the second end of the elongate flexible member having a valve stem engagement member configured to removably attach to the valve stem, the second end projecting from the directed air outlet.

15. A method of assembling a wheel assembly having a tubeless tire, a corresponding wheel rim, and a corresponding valve stem, the method comprising:

(a) providing the wheel rim with the tubeless tire disposed on the wheel rim in an unseated configuration;

(b) attaching a hand-held sealing device having a valve stem engagement member to the valve stem;

(c) pressing an air output nozzle disposed on the hand-held sealing device against the wheel rim over a valve stem hole defined in the wheel rim;

(d) actuating a valve assembly of the hand-held sealing device thereby releasing a pressurized air flow through the directed air outlet, through the valve stem hole, and into a cavity defined between the tubeless tire and the corresponding wheel rim;

(e) sealing the tubeless tire on the corresponding wheel rim; and (f) pulling an elongate flexible member connected to the valve stem engagement member through a cable opening wherein the cable opening extends from the directed air outlet through an outer surface of the hand-held sealing device, thereby positioning the valve stem in the valve stem hole.

16. The method of claim 15, wherein step (b) is accomplished by passing the elongate flexible member through the valve stem hole and attaching the valve stem to the valve stem engagement member while the valve stem is on the side of the wheel rim corresponding to the cavity.

17. The method of claim 15 further comprising:

removing the valve stem engagement member from the valve stem once the tubeless tire is sealed on the corresponding wheel rim.

* * * * *